United States Patent [19]
Foxwell

[11] Patent Number: 5,485,757
[45] Date of Patent: Jan. 23, 1996

[54] ENGINE TORQUE SENSING ARRANGEMENT

[76] Inventor: W. John Foxwell, 2557 Lake Charnwood Blvd., Troy, Mich. 48098-2123

[21] Appl. No.: 365,415

[22] Filed: Dec. 28, 1994

Related U.S. Application Data

[63] Continuation-in-part of PCT/US94/01940, Feb. 23, 1994.
[51] Int. Cl.⁶ ........................................................ G01L 3/10
[52] U.S. Cl. .............................. 73/862.321; 73/862.328
[58] Field of Search ......... 73/862.321, 862.324–862.328, 73/862.331, 862.338, 118.1

[56] References Cited

U.S. PATENT DOCUMENTS 2,403,952  7/1946  Ruge ................................. 73/862.338
4,135,390  1/1979  Templin ............................. 73/862.326
4,297,877  11/1981  Stahl ................................. 73/862.338
4,592,241  6/1986  Obayashi et al. .................. 73/862.328

Primary Examiner—Robert Raevis
Attorney, Agent, or Firm—John R. Benefiel

[57] ABSTRACT

Four different torque sensing arrangements are described: one for an engine driving a torque converter housing (2) for an automatic transmission, two are for engines with two piece flywheels (31, 35 and 80, 86) and one for a three piece coupler (61, 64, 67), where sets of cantilever blade type springs (18, 48, 74, and 118) are arranged to allow a limited extent of rotation of driving and driven members proportioned to the torque being transmitted from the engine to the transmission and vice versa. The relative movement between the member is detected by electronic sensing devices (22, 23; 52, 53; 78; and 132, 134) generating signals transmitted to an on board microprocessor (25 and 55) or other electronic unit.

25 Claims, 6 Drawing Sheets

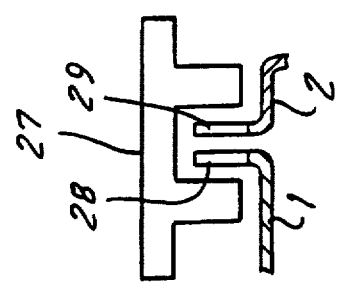
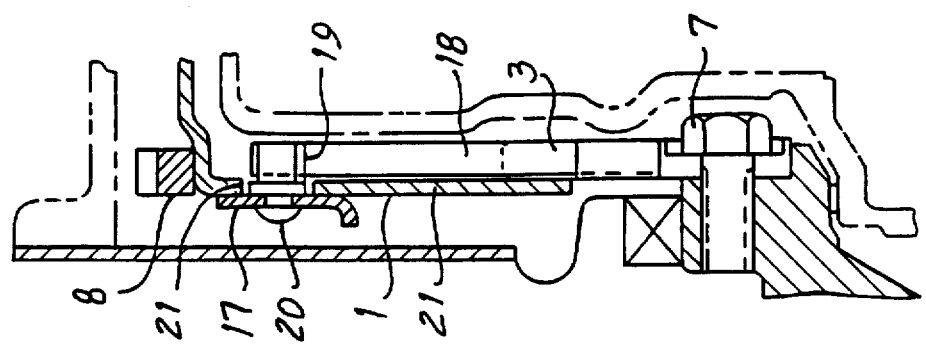
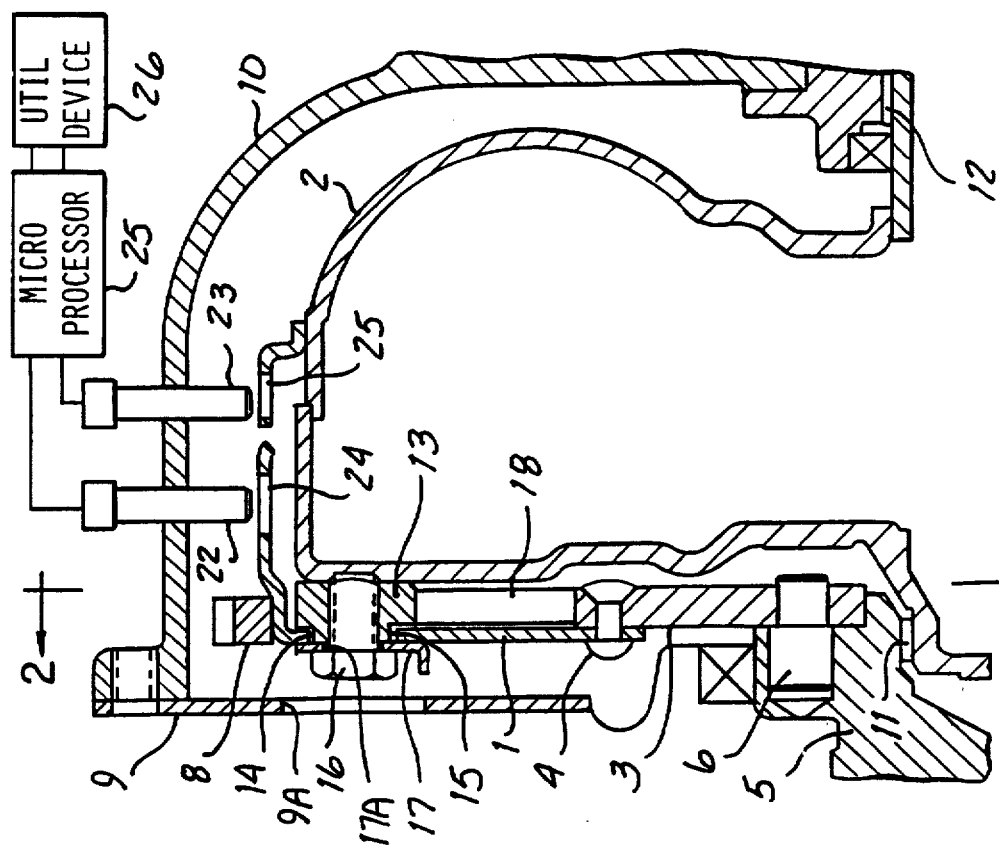

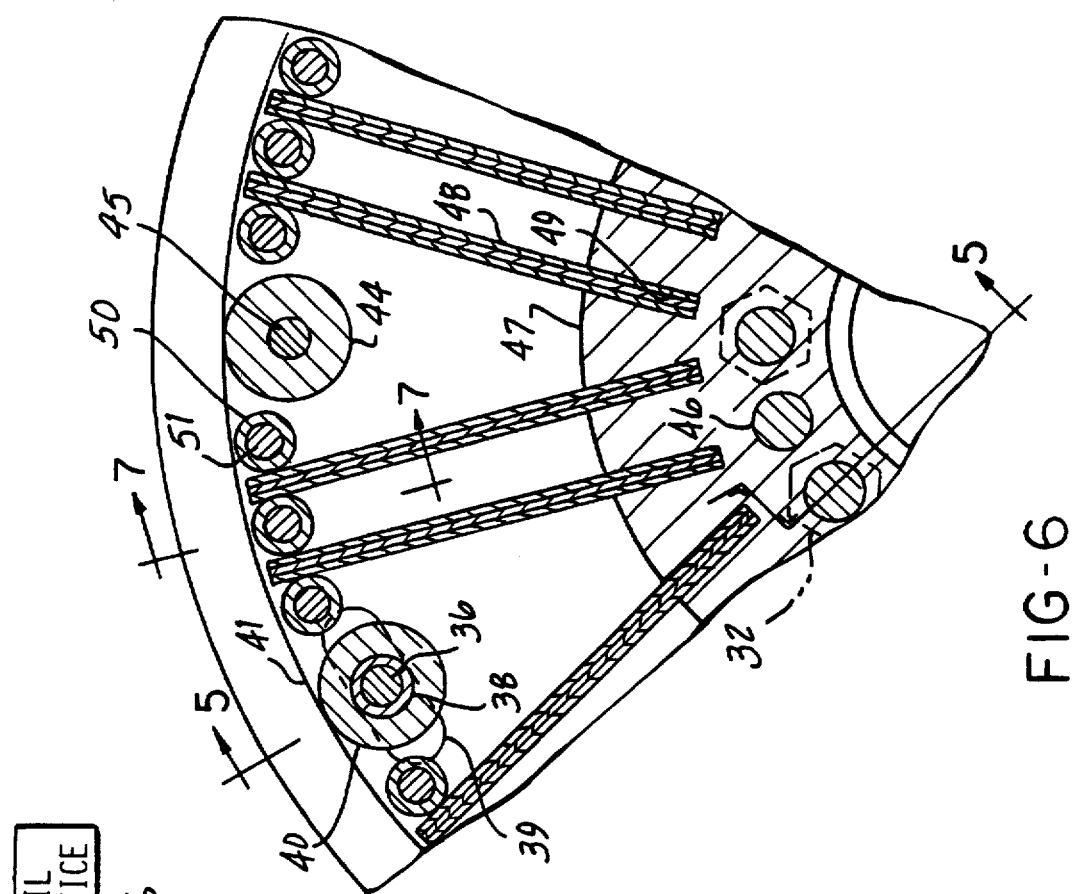

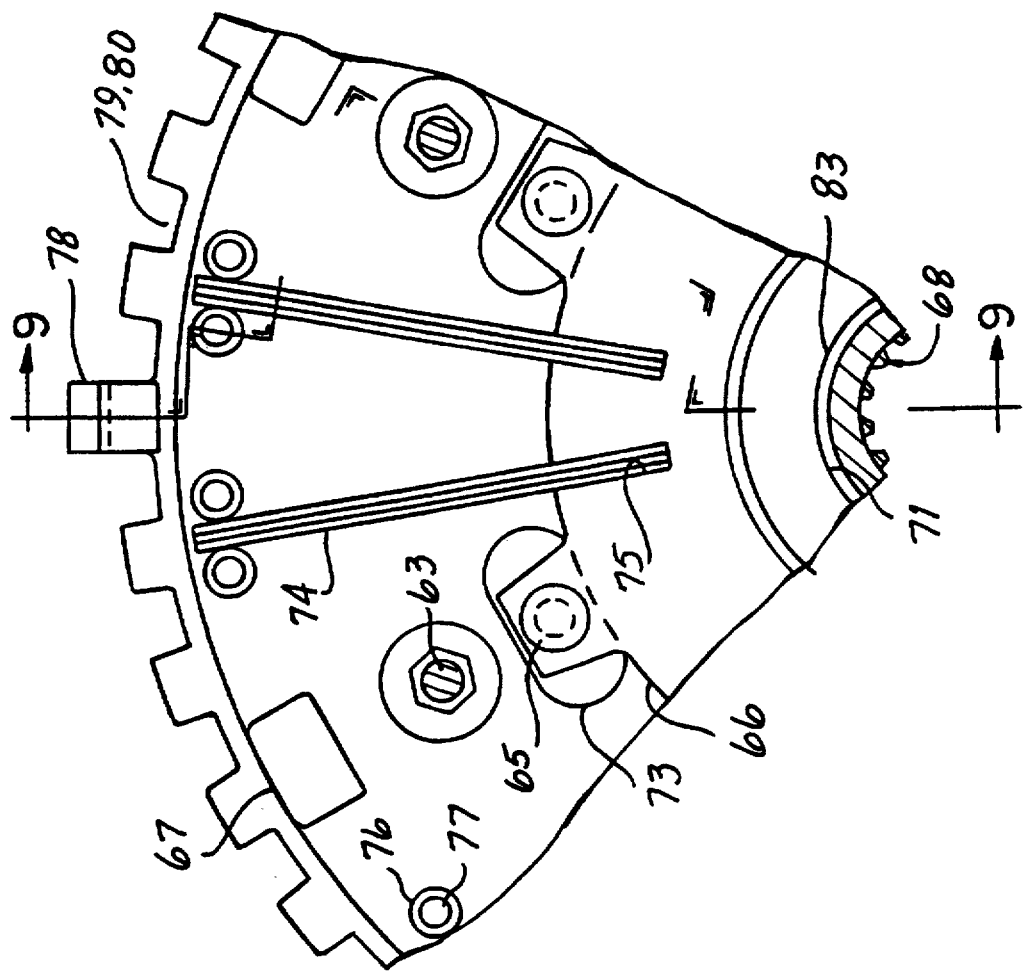
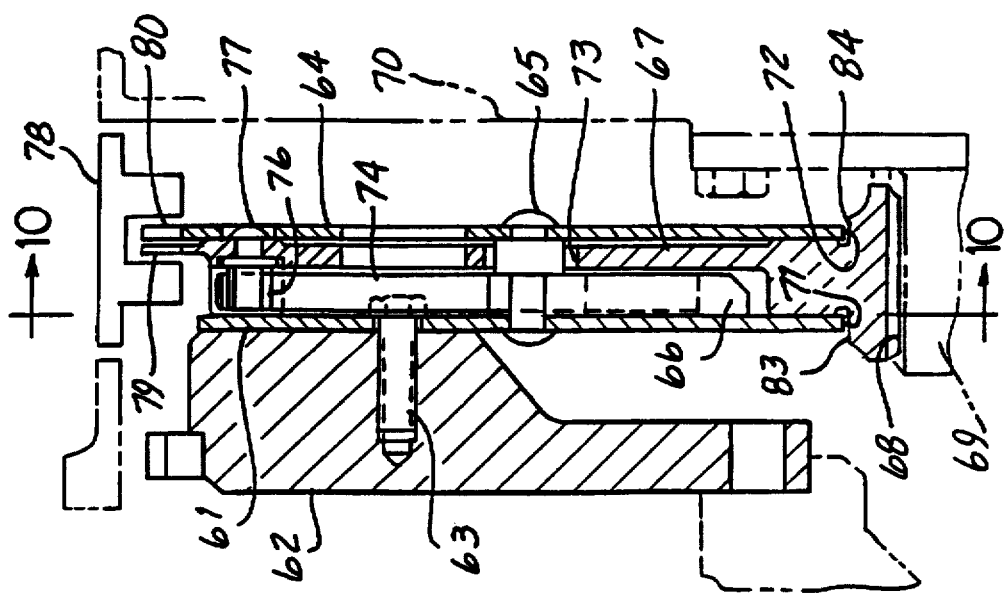

ENGINE TORQUE SENSING ARRANGEMENT

CROSS-REFERENCE TO RELATED APPLICATION

This application is a continuation-in-part of PCT application Ser. No. 94/01940, international filing date Feb. 23, 1994.

BACKGROUND OF THE INVENTION

This invention concerns the generation of signals corresponding to the torque produced by an internal combustion engine. The measurement of torque produced by an engine is generally carried out in a test cell using elaborate and expensive equipment and is time consuming. It is difficult to monitor torque under actual running conditions such as in an automobile. Measurement of spring resisted deflections in the drive line of a transmission mechanism have been developed but none of these have been particularly adapted to detect engine torque under running conditions in an automobile.

Internal combustion engines power practically every kind of mobile machine from automobiles, trucks, tractors, tanks, boats, seagoing vessels, airplanes, air compressors, and lawn mowers. Electronic control systems are now extensively used in automobiles to monitor and manage engine functions because they have proven to be cost effective and reliable and have improved the function, performance, reliability, and efficiency of automobile engines in ways unrecognizable even a decade ago. Very few automobiles are produced without a microprocessor on board.

It would be advantageous to provide an engine torque sensing device generating electronic signals during operation of the engine so as to be able to process signals for further use in these microprocessors. For example, when engine torque and engine speed are monitored, they are together proportional to engine horsepower which could then be readily displayed on the instrument panel of a vehicle and could warn the driver, in an open loop system, to carry out a certain function such as changing gears. More importantly, it could in a closed loop system automatically shift the gears of automatic transmissions when working with the other inputs currently employed to improve the efficiency and shift quality.

A torque sensing device could also be adapted to sense the degree of overrun which occurs such as when a diesel truck is descending a hill and the engine overspeeds. A retarder could automatically be activated in conjunction with other inputs to slow down the vehicle.

On farm tractors, torque sensing devices are sometimes used to raise or lower a tillage implement just sufficiently to maintain tractor speeds when the soil or terrain conditions vary. When climbing slopes they can downshift a power shift transmission. The device also senses the torque fluctuations in a power-take-off drive (P. T. O.) and when the crop fed into a forage harvester gets too large, downshifting a power-shift transmission can take place until the adverse conditions pass.

Engine horsepower testing is generally carried out in a test cell and the results obtained often vary from those actually realized in a vehicle because the air intake systems, the cooling systems, and the exhaust systems are seldom similar. An electronic torque device could read out the horsepower actually occurring and would be advantageous in monitoring engines for maintenance tune-ups, classification, and regulatory tests.

For instance, farm tractor P. T. O. power and drawbar horsepower are checked at the University of Nebraska test station at Lincoln before the tractor can be sold, and also in several other locations around the world. It would be advantageous to be able to read the horsepower at the flywheel and compare it with the P. T. O. horsepower and drawbar horsepower so that the drive line efficiencies could be determined. In the field, the overall work efficiency could be continuously monitored by comparing the flywheel horsepower with the drawbar horsepower which can be easily measured when pull type implements are coupled to the tractor drawbar.

Torque sensing during engine running as described could be used to improve the function and efficiency of a wide variety of machinery which is power driven by internal combustion engines to an extent not possible today.

Further, U.S. Pat. No. 4,592,241 describes elastic blade type members to transmit torque between a first rotating member and a second rotating member, and these members are shown mounted singly in close fitting slots at both their inner and outer ends. This arrangement would cause the springs to bind in the slots and cause severe fretting corrosion at the end of each spring and where they exit the slots due to the radial movement occurring during deflection under torsional loads. They can also tilt sideways and bind causing more friction. Further, the deflection of these members would be extremely small and difficult to accurately detect. Also, the binding of the spring members in the slots during loading and unloading of the springs would cause high hysteresis and would not result in a straight line relationship between torque and angular deflection of the flywheel pieces as shown in FIG. 4 of the patent. Embodiments shown in FIGS. 5–8 of that patent would result in even smaller deflections for the detectors to pick up.

U.S. Pat. No. 4,135,390 attempts to signal engine torque by having a pair of detectors measuring the differential in movement at the inner and outer ends of a series of spokes formed in the face of a flex plate connecting an internal combustion engine to the torque convertor housing of an automatic transmission. As with the embodiments in U.S. Pat. No. 4,592,241, the deflections under the sensors are extremely small and parasitic forces caused by temperature variations would cause inaccurate torque signals to be sent to the microprocessor.

The object of the present invention is to provide engine torque sensing by an arrangement incorporated into the engine-transmission drive connection which overcomes the disadvantages of the arrangement shown in U.S. Pat. Nos. 4,592,241 and 4,135,390.

SUMMARY OF THE INVENTION

The above-recited object of the present invention, and other objects which will become apparent upon a reading of the following specification and claims, is accomplished by arrangements in which blade springs sets are incorporated in the engine-transmission coupling to allow relative angular displacement proportional to engine torque.

A first embodiment of the invention comprises an arrangement incorporated in the components by which engines are directly coupled to automatic transmissions, including a torque converter such as in current use in automobiles with both front and rear wheel drives, as well as in trucks, buses, off-road, and military vehicles.

In this first embodiment of the invention, the spring coupling is integrated into a flexplate commonly employed to connect an engine crankshaft to a torque converter housing. The flex-plate is formed with a series of arcuate slots through which freely pass stepped diameters formed on internally threaded bushings (or externally threaded studs) attached to the torque converter housing, each of which receive a threaded fastener such as a bolt passing through the flex-plate and into the internal thread of a respective bushing or nut received over a stepped diameter stud. The stepped diameters allow the flex-plate to have an endwise clearance with the torque converter housing so that the flex-plate and torque converter housing can freely rotate relative to each other to an extent limited by the stepped diameters contacting the ends of the arcuate slots in the flex-plate after the threaded fasteners are tightened. The flex-plate no longer transmits torque from the crankshaft to the torque converter.

In this embodiment, torque is transmitted by a plurality of blade shaped springs arranged in sets and anchored firmly in radial slots formed in a hub attached to the flex-plate so that they extend radially outwardly from the slots. The spring blade sets are received between pairs of contact rollers, which turn on pins connected to a driven disc which is bolted against the front side of the flex-plate near its outer diameter by the bolt fasteners connected to the torque converter housing during assembly.

Torque from the engine or reverse torque from the wheels of the vehicle during overrun such as during braking will deflect the spring blades either direction from their no load positions to an extent determined by the amount of circumferential clearance that the stepped diameters of the bushing fasteners have with the width of the arcuate slots. This limitation of the relative motion between the torque converter housing and the flex-plate allows the maximum bending stress in the spring blades to be kept to safe limits for infinite life in service.

The spring blades are preferably of the same commercial grade of spring steel from which valve springs are made are fixedly anchored at their inner ends to make them resistant to the effects of centrifugal force and torsional oscillations and sideways tilting and during deflection they contact rollers to reduce friction, wear, and hysteresis during loading and unloading from the no load position.

To ensure that the angular deflection detected between the flex plate and the torque converter housing is sufficiently large for the sensors to send accurate and easily decoded signals to the on board microprocessor, more than one spring blade can be accommodated if necessary in each slot. For instance, sets of three thin blades may be arrayed about the axis of the flex plate. For example, twelve sets of three blades totalling thirty-six spring blades may be employed. In this case, the deflection will be 1.73 times greater than if twelve thicker spring blades were used.

To complete the sensing of torque, suitable slots or other features are formed on the peripheries of the flex plate and the torque converter housing to be sensed by position sensors, the electrical output signals are directed to on board microprocessors to be used to control such as ignition timing, air-fuel ratios, gear selection, etc.

The second embodiment comprises a two-member flywheel, with a first member fixed to the engine crankshaft. A second member has mounted thereto a series of bearing rollers circumferentially spaced about the axis of rotation, with the first member supporting the second member by the rollers for free limited rotation to minimize friction and hysteresis in relative angular movement of the two members. A pin and slot interconnection between the first and second members defines the limits of relative rotation.

A series of spaced spring engaging rollers are also provided receiving the free ends of blade spring sets fixed to a hub attached to the first member in essentially similar fashion to the first described embodiment.

In a third embodiment where neither a friction clutch or a close-coupled torque converter is used, a separate disc type torque sensor is connected to a one-piece flywheel. The spring coupling means includes two thin metal discs spaced apart by stepped spacers and they drive an interposed driven member by a connection allowing a limited angular distance against the resistance of a series of blade spring sets fixed at their inner end and their outer free ends received between roller sets.

A fourth embodiment shows a further way to connect the front and second member of a two-member flywheel to each other.

DESCRIPTION OF THE DRAWINGS

FIG. 1 is a fragmentary sectional view taken along the line 1—1 in FIG. 2 of a coupling connection between an engine transmission and a torque converter incorporating the torque sensor arrangement according to a first embodiment of the present invention, together with a block diagram representation of an associated microprocessor and a utilization device.

FIG. 3 is a fragmentary sectional view taken along the line 3—3 in FIG. 2.

FIG. 4 is a fragmentary sectional view of an alternate displacement sensor arrangement.

FIG. 5 is a fragmentary sectional view taken along the line 5—5 in FIG. 6 of a flywheel clutch engine connection incorporating a torque sensor arrangement according to a second embodiment of the present invention, with a block diagram representation of an associated microprocessor and utilization device.

FIG. 6 is a fragmentary sectional view taken along the line 6—6 in FIG. 5.

FIG. 9 is a fragmentary sectional view taken along the line 9—9 in FIG. 10 of coupling connection between a flywheel and transmission incorporating a torque sensor arrangement according to a third embodiment of the present invention.

FIG. 10 is a fragmentary sectional view taken along the line 10—10 in FIG. 9.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 2:
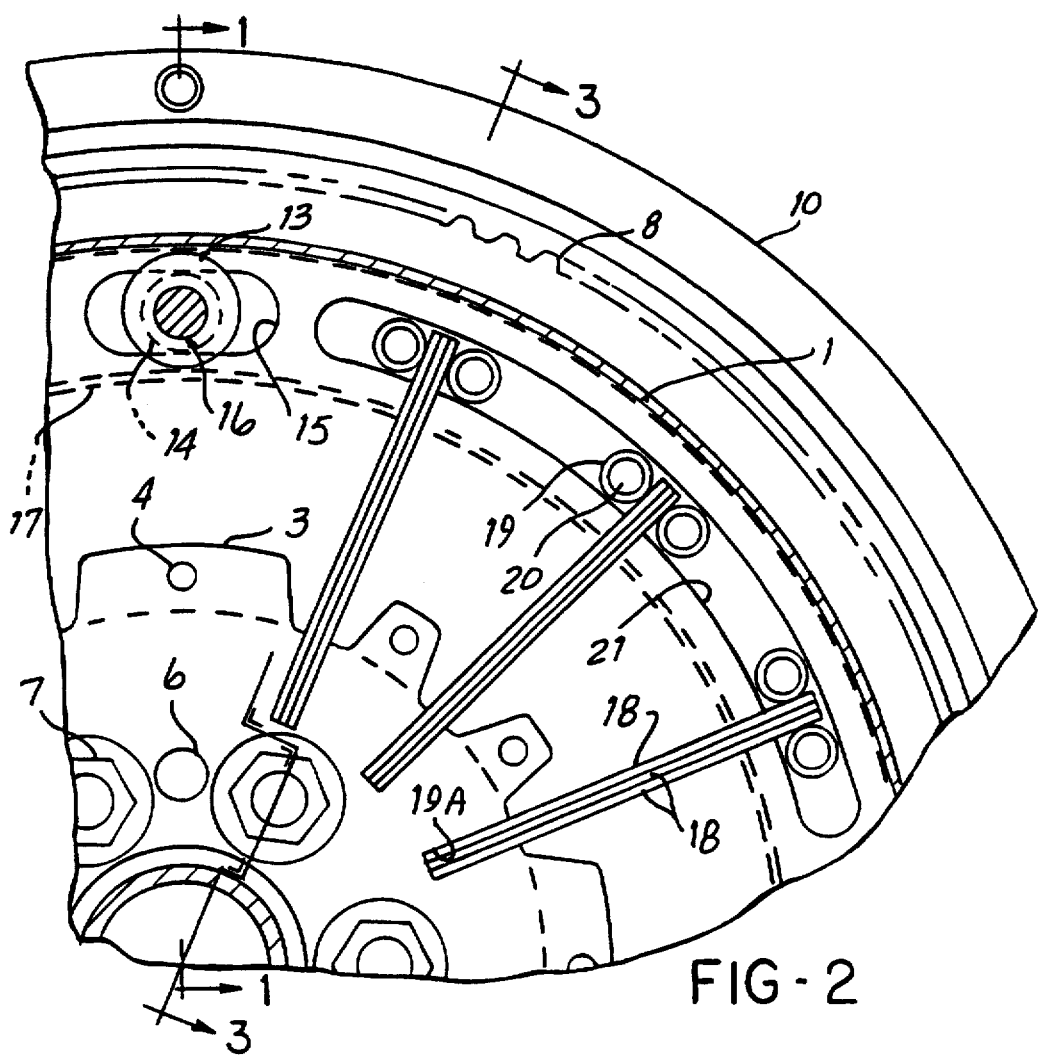
FIG. 2 is a fragmentary sectional view of the section taken along the line 2—2 in FIG. 1.

Referring to FIGS. 1, 2, and 3, the first embodiment of this invention provides a torque sensor arrangement operating between an engine flex plate 1 and a torque converter housing 2. In this depiction, the flex plate 1 is attached to a driving hub 3 by rivets 4 which is connected to the crankshaft 5 by the dowel 6 and bolts 7. The starter ring gear 8 is shown shrunk onto the outer periphery of the flex plate 1. The engine to transmission housing adapter plate 9 is shown abutting the flange of the transmission housing 10.

The torque converter housing is shown supported by a bearing 11 mounted in the engine crankshaft 5 and at its rear by a bearing 12 which is supported in the transmission housing 10.

In the arrangement shown, the torque converter housing 2 has four round internally threaded bushings 13 welded to its front face near its outer periphery. These bushings 13 have stepped diameters 14 which pass through arcuate slots 15 formed in the flex plate 1. Bolts 16 pass through round holes in an annular driving disc 17 and engage with the internal threads in the bushings 13 and tightens the driving disc 17 against the faces of bushings 13. This leaves the flex plate 1 free to revolve relative to the torque converter housing 2 because the stepped diameters 14 are longer axially than the thickness of the flex plate 1. The amount of rotary movement is governed by the size of the stepped diameters 14 contacting the ends of the arcuate slots 15. The torque converter housing 2 is located endwise to the flex plate 1 which is trapped between the driving disc 17 and the shoulders of the stepped diameters 14.

In some torque converter designs which employ threaded studs and nuts instead of bushings and bolts the stepped diameters would be formed on the studs.

A plurality of rectangularly shaped blade springs 18 are arranged in sets and fixedly anchored at one end in slots 19A spaced around the driving hub 3 so that they extend radially from the slots 19A. This anchoring may be accomplished by casting or sintering the inner ends in the slots 19A or LOCTITE™ 620 adhesive may be used. The blade springs 18 can be arranged in various combination of the slots 19A and in sets to suit the power of different engines.

The blade springs 18 connect the driving hub 3 with the torque converter housing 2 by having their free ends received between the rollers 19 near their outer ends. These rollers 19 rotate on pins 20 which are rivetted to the driving disk 17. The pins 20 pass through the arcuate slots 21 in flex plate 1. Engine torque or reverse torque from the wheels of the vehicle will deflect the blade springs 18 either side of their no load positions to an extent governed by the amount of movement allowed before the abutting of the stepped diameters 14 in the arcuate slots 15. This limits deflection of the blade springs 18 to prevent their overstressing.

This movement is detected by position sensors 22 and 23 interfacing with teeth 24 and 25 formed in the peripheries of the flex plate 1 and torque converter housing 2 respectively. Diagrammatic representations of an on board microprocessor 25 and a utilization device 26 are shown.

FIG. 3 also shows how the flex plate 1, driving hub 3, driving disc 17, sets of blade springs 18, pins 20, rollers 19 and the starter ring gear 8 can be subassembled and bolted to the crankshaft 5 before the transmission housing 10 and torque converter housing 2 are brought together with the engine. At this stage, only the holes 17A in the driving disc 17 have to be lined up with the threaded holes in the fasteners 13. The bolts 16 are inserted one at a time through an opening 9A in the adapter plate 9. This is no different from lining up the fasteners 13 with the round holes in a conventional flex plate assembly without the presence of the torque sensor arrangement.

FIG. 4 shows an optional sensor in the form of an electroptical device 27 interfacing with radial slots 28 and 29 formed in the peripheries of the flex plate 1 and the torque converter housing.

FIGS. 5–8 show a torque sensor according to the invention using a two piece flywheel, consisting of a driving member 31 attached with bolts 32 to the crankshaft 33 of an internal combustion engine. A starter ring gear 34 is shown shrunk on to the periphery of the driving member 31. The driven member 35 of the two part flywheel has a boss portion 35A which nestles inside a circular recess 31A in the driving member 1 and retained longitudinally by a series of bolts 36, retaining disc 37, and the hollow sleeves 38. The sleeves 38 are located in counterbores 38A in the front face of the driven member boss 35A and pass through arcuate slots 39 in the driving member 31. A series of rollers 40 rotate on the sleeves 38 and bear on the inside of a recess diameter 41 in the driving member 31.

The driven member 35 is thus rotatably supported on the driving member 31 by the rollers 40 and 44, which eliminates friction and provide large diameter rotational support.

The driving member 31 and the driven member 35 are thus free to rotate relative each other by the amount of circumferential clearance which the sleeves 38 have in the arcuate slots 39. An endwise free play is provided between the rear face 37A of the retaining disc 37 and the bottom face 42A of the circular recess 42 machined in the front face 31B of the driving member 31. An endwise clearance also exists between the rear face 31C of the driving member 31 and the recessed face 35B of the driven member 35 except where they touch at 43. The first endwise clearance allows free relative rotation between the driving member 31 and driven member 35.

A further series of rollers 44 are located on pins 45 pressed into the front face of the driven member 35 (shown in FIG. 6).

Figures 7, 8:
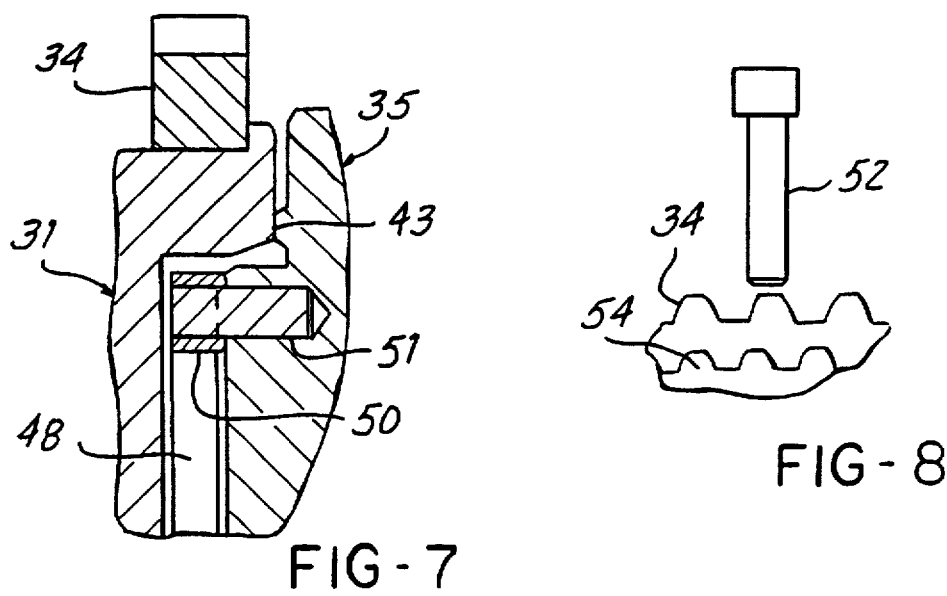
FIG. 7 is a fragmentary sectional view taken along the line 7—7 in FIG. 6.
FIG. 8 is a fragmentary end view taken in the direction of the arrows 8—8 in FIG. 5.

Engine torque is transmitted from the crankshaft 33 through the bolts 32 and the dowel 46 to the driving hub 47 and then by sets of blade springs 48 anchored at their inner ends in slots 49 formed in the driving hub 47, their outer free ends passing between and in contact with the rollers 50 centered on pins 51 pressed into the front face of the driven member 35 (see FIG. 7). The blade springs 48 are shown packed in sets of three in each slot 49 in order to increase their deflection compared to using a single blade spring 48 under the same load. In the arrangement shown, torque can be transmitted in both directions.

A dust deflector 57 is bolted to the driving hub 47 by the bolts 32. A friction clutch is shown at 58.

Two position sensors 52 and 53 are diagrammatically shown juxtaposed with the teeth in the starter ring gear 34 and teeth 54 formed on the periphery of the driven member 35 to send electronic signals corresponding to angular deflection of the driven member 31 and driven member 35 to an on board microprocessor 55 and a utilization device 56.

FIG. 9 and 10 refer to a typical three piece coupling driving a transmission with its own disconnect clutches.

The first driving member 61 is bolted to an engine flywheel 62 by bolts 63. The driving member 61 is connected to a second driving member 64 by stepped rivets 65 which also attach the driving hub 66 to the driving member 61. A driven member 67 is positioned and trapped between the driving members 61 and 64 and has internal splines 68 machined in its hub to drive the input shaft 69 of a transmission carried in the housing 70. The inner diameters 71 and 72 ride on the outside diameters 83 and 84 of the hub of driven member 77. Arcuate slots 73 formed in the driven member 67 allow the stepped rivets 65 to pass through and they also limit the rotation between the driven member 67 and the driving members 61 and 64.

The transmission of torque from the flywheel 62 and the driving members 61 and 64 is by rectangular blade springs 74 fixedly anchored at their inner ends in slots 75 formed in the driving hub 66 and passing between and contacting at their outer ends rollers 76 which are free to rotate on pins 77 riveted to the driven member 67. Engine torque or reverse torque from the vehicles wheels will deflect the blade springs 74 either side of their no load position to an extent governed by the movement the stepped rivets 65 have in the arcuate slots 73. This movement is detected by position sensors or an electro-optical sensor 78 interfacing the slots 79 and 80 cut radially in peripheral extensions of the driven disc 67 and driving disc 64 respectively.

Figure 11:
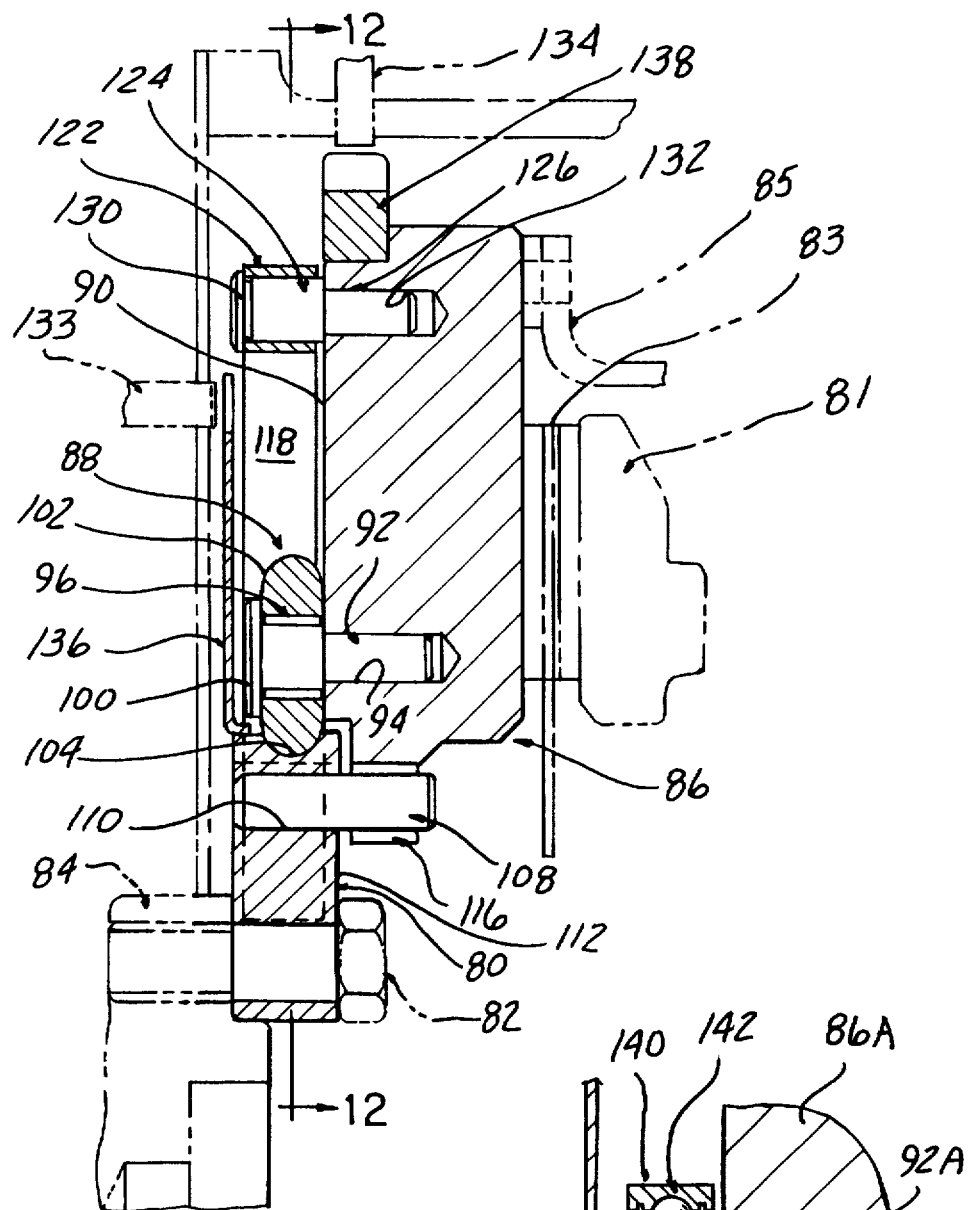
FIG. 11 is a fragmentary sectional view taken along the line 11—11 in FIG. 12 through a two-piece flywheel of an alternate design from that shown in FIGS. 5–6, which also incorporates a torque sensor arrangement according to the present invention.
Figure 12:
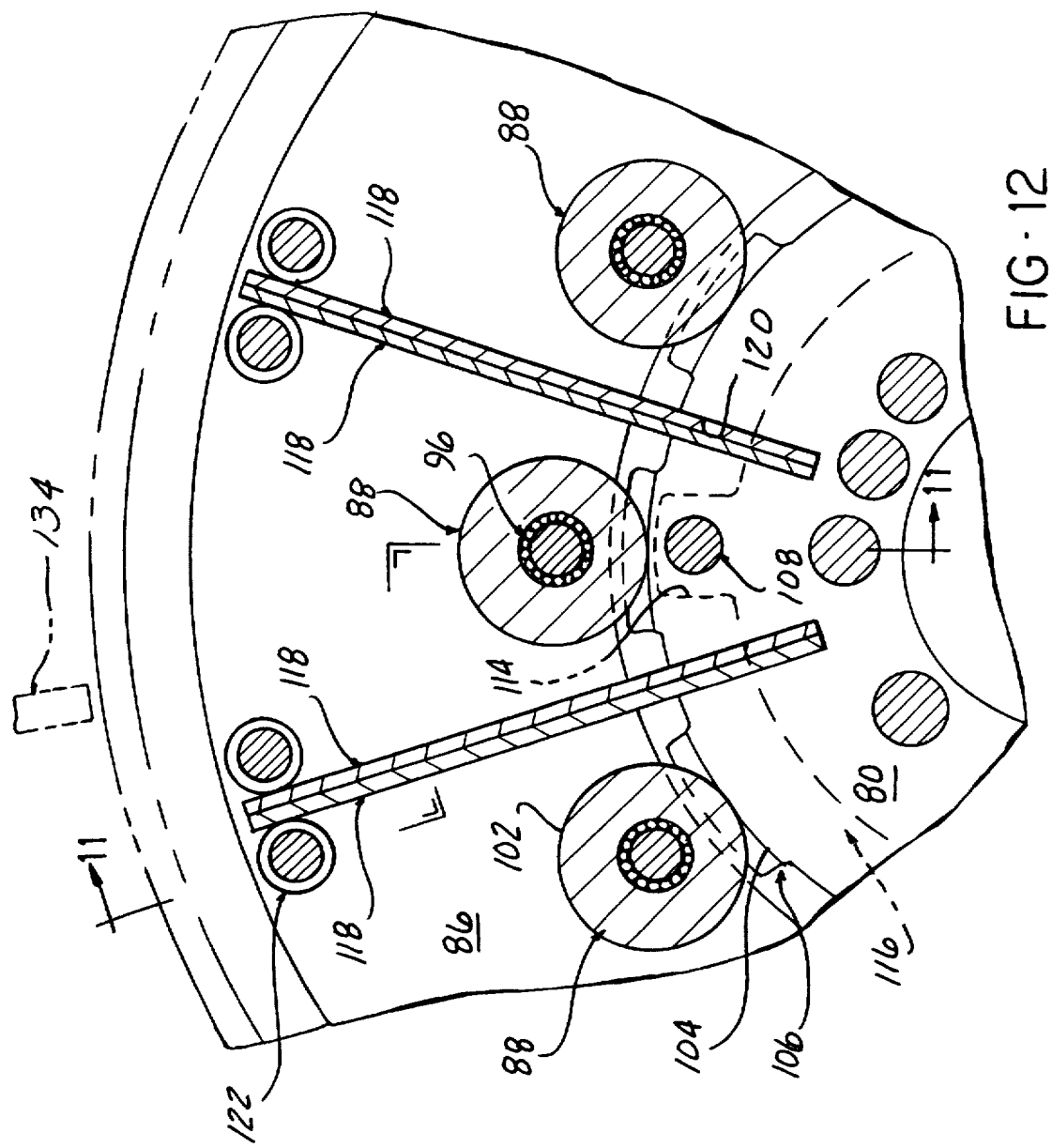
FIG. 12 is a fragmentary sectional view taken along the line 12—12 in FIG. 11.

FIGS. 11 and 12 depict another way to construct a two-member flywheel which eliminates the friction occurring at the faces 31C, 43, 42A, and 37A in the embodiment shown in FIGS. 5 and 7.

A first or driving member 80 is attached with bolts 82 to an engine crankshaft 84, while an outer, second or driven member 86 is engageable with a pressure plate 81 and clutch disc 83. A clutch cover 85 is also depicted in phantom.

The annular driven member 86 has a circumferentially arrayed series of rollers 88 mounted to its front face 90 by means of the shouldered pins 92 pressed into axial bores 94 in the front face 90. The rollers 88 are rotatably mounted on the pins 92 by means of needle bearings 96, and are axially confined by heads 100 on the pins 92.

The rollers 88 are toroidal in shape having a semicircular in section peripheral surface 102 which run in semicircular grooves 104, formed into radial protrusions 106 projecting radially from the perimeter surface of the hub of driving member 80.

The driven member 86 is thus supported for limited rotation on the outer perimeter surface of the hub of the driving member 80.

The extent of rotation is defined by engagement of pin and slot arrangements each comprised of a pin 108 which is press fit into an axial bore 110 in a radial face 112 of the drive member 80 and a slot 114 through the inner flange 116 of the driven member 86. The pin 108 is normally centered in the slot 114 with a predetermined clearance in either circumferential direction allowing a predetermined limited extent of relative rotation between the driving member 80 and driven member 86 in either direction.

The driving member 80 and driven member 86 are rotatively coupled by a series of blade springs 118 fixed at their inner ends in radial slots 120 of the driving member 80 in the outer perimeter intermediate the lugs 106, a suitable adhesive such as LOCTITE™ 620 is used for this purpose.

The blade springs 118 are received between pairs of rollers 122 revolvable on the heads 124 of pins 126, retained thereon by integral flanges 130. The pins 126 are press fit in axial bores 132 in the face 90 of the driven member 86 directed towards the drive member 80, and project axially over the outer perimeter of the driving member 80 such that the rollers 122 are disposed to receive the outer ends of the blade springs 118 therebetween.

The blade springs 118 are in a relaxed state with the pin 108 centered in the slot 114 and exert a spring force by cantilever bending thereof resisting relative rotation in either direction.

The blade springs 118 can be provided in sets of two as shown, or sets of three as shown in the drawing FIGS. 5 and 6 discussed above to suit the particular applications.

The extent of relative rotation corresponds to the torque level, and this relative rotation is measured by a pair of sensors 133 and 134. Sensor 133 is positioned adjacent a disc 136 having a slotted periphery and sensor 134 is positioned adjacent a starter ring gear 138 shrunk onto the outer diameter of driven member 86. Other arrangements of sensors are possible.

The starter ring gear 138 in being mounted on the driven member 86 results in a cushioning action, as the blade springs 118 are interposed between the driven member 86 and the drive member 80 connected to the engine crankshaft. This reduces shocks imposed on the starter motor to prolong its life.

The sensors 133 and 134 generate electronic signals from which the electronic torque can be generated for use in an on board computer to control air-fuel ratio, shift gears, etc., as described above.

Figure 13:
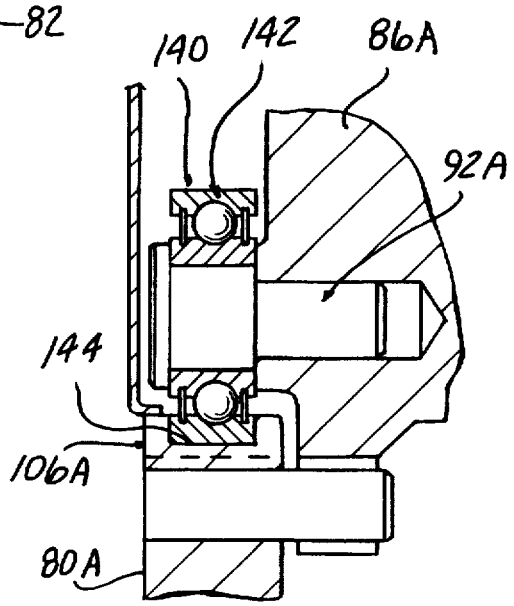
FIG. 13 is a fragmentary sectional view of an alternate form of the roller shown in FIGS. 11 and 12.

FIG. 13 illustrates a modification of this design in which deep grooved sealed ball bearings 140 are press fit onto headed pins 92A having stems pressed into the opposing face of driven member 86A.

The outer race element 142 of each bearing 140 runs in a groove 144 machined into lugs 106A projecting radially from the outer perimeter of the drive member 80A. Endwise and radial clearances are minimal.

Friction is thus minimized by this arrangement to substantially eliminate hysteresis as the blade spring 118 flex during engine loading of the drive train in either direction.

The mounting of the sets of blade springs in each of the above embodiments minimizes wear, friction and hysteresis, are easily assembled, and enable easy adoption to the requirements of particular engine transmission combinations. Fretting corrosion caused by centrifugal forces and torsional oscillations is likewise avoided.

The large spring deflections resulting in the use of multiple thin springs may eliminate the need for the torsional dampener currently used in the lock-up clutches of automotive transmissions and also those used with manually operated friction clutches.

I claim:

1. A torque sensing arrangement for an engine transmission connection including an engine crankshaft and a torque converter housing, said torque sensing arrangement comprising:

a driving hub connected to said engine crankshaft to be rotated thereby;

a flex plate fixed to said driving hub;

a circumferential series of stop elements fixed to said torque converter housing and passing through respective arcuate slots in said flex plate, limiting relative rotation between said torque converter housing and said flex plate to a predetermined extent;

a series of radially extending blade springs fixedly anchored at their inner ends to a respective one of a series of slots in said driving hub;

a circumferential series of pairs of spaced elements fixed to a driving disc connected to said torque converter housing, each of said blade springs having a radially outward free end passing between pairs of said spaced elements to be captured therebetween; and sensor means for detecting the extent of relative angular movement between said flex plate and said torque converter housing and generating signals corresponding thereto.

2. The torque sensing arrangement according to claim 1 wherein said spaced elements comprise rollers.

3. The torque sensing arrangement according to claim 1 wherein said blade springs are arranged in sets, with blade springs in each of said sets overlying each other.

4. The torque sensing arrangement according to claim 1 wherein each of said stop elements has a larger sized portion larger than a radial dimension of said arcuate slots and a smaller sized portion passing through a respective arcuate slot, said smaller sized portion having an axially greater dimension than the thickness of said flex plate to ensure an axial end play sufficient to allow free relative rotation between said flex plate and said torque converter housing to the extent permitted by said arcuate slots.

5. The torque sensing arrangement according to claim 4 further including an annular disc positioned against said smaller sized ends of said stop elements and a respective threaded fastener received by securing said disc thereagainst.

6. The torque sensing arrangement according to claim 1 wherein said flex plate has an axially extending tubular body portion extending over said torque converter housing, a starter gear fixed over said portion, said sensor means including detectors positioned over said tubular body portion and an adjacent portion of said torque converter housing to detect relative angular movement therebetween.

7. A torque sensing arrangement for an engine crankshaft transmission connection, said arrangement including:

a two member flywheel, comprised of a first member fixed to said crankshaft; and a second member having a series of rollers rotationally supporting said second member on said first member;

a hub portion on said first member formed with a series of slots;

a series of radially extending blade springs each having an inner end fixedly anchored in one of said hub slots;

a series of circumferentially spaced pairs of spring engaging elements receiving therebetween a free end of a blade spring, said blade springs engaged thereby in a circumferential direction but not restrained in a radial direction, to create a spring resistance to relative rotation between said first and second flywheel members;

a series of arcuate slots in said first member;

a series of axially extending stop elements fixed to said second member and projecting through a respective one of said arcuate slots to allow limited relative rotation between said first and second members; and, sensor means sensing the extent of relative angular displacement between said first and second members and generating electronic signals corresponding thereto.

8. The torque sensing arrangement according to claim 7 wherein said first member is formed with a recess having a cylindrical bearing surface adjacent the outer perimeter thereof, and wherein said rollers are revolvably mounted on one of a series of roller support elements fixed to said second member and projecting axially into said recess of said first member.

9. The torque sensing arrangement according to claim 8 wherein said stop elements also comprise at least some of said roller support elements, said arcuate openings formed into said first member adjacent said recess, said stop elements having a portion projecting into said recess and having one of said rollers received thereover.

10. The torque sensing arrangement according to claim 9 wherein said stop elements each are comprised of a sleeve and a bolt passing within said sleeve and threadably received in said second member.

11. The torque sensor arrangement according to claim 10 wherein a retaining disc is secured against front faces of the said sleeves by said bolts to axially confine said second member from moving rearwardly relative to said first member.

12. The torque sensing arrangement according to claim 7 wherein said spring blades are stacked together in groups.

13. The torque sensing arrangement according to claim 7 wherein said spaced pairs of spring engaging elements comprise rollers mounted to said second member interposed between said support rollers.

14. A torque sensing arrangement for generating electronic signals corresponding to the level of torque transmitted between a pair of rotary members and, a third rotary member said arrangement comprising:

a series of radial pockets formed about a perimeter portion of one of said pair of rotary members;

the third said rotary member having a series of circumferential spaced pairs of spring engagement elements extending axially and aligned with either side of an associate pocket but radially spaced from said associated pocket;

a series of blade springs each having an inner end fixedly anchored in one of said pockets and an outer end freely received between a pair of said spring engagement elements but establishing a rotary driving connection therebetween;

stop means allowing limited relative rotation between said pair of rotary members and said third member against resistance created by said blade springs; and, sensor means for detecting the extent of relative rotation between said pair and said third members and generating corresponding electrical signals.

15. The torque sensing arrangement according to claim 14 wherein said blade springs are adhesively bonded in said pockets.

16. The torque sensing arrangement according to claim 14 wherein said blade springs are stacked together in sets of three, each set fixed in a respective pocket.

17. The torque sensing arrangement according to claim 14 wherein said spring engaging element comprise rollers contacting said free ends of said blade springs.

18. A torque sensing arrangement for an engine crankshaft-transmission connection, said arrangement including:

a two member flywheel, comprised of a first drive member adapted to be fixed to an engine crankshaft;

a second driven member adapted to be engageable with a transmission clutch, said first member having a hub outer perimeter surface;

a series of support rollers, each rotationally supported on a pin projecting axially from said second driven member over said first member outer perimeter and rolling on said first drive member hub surface;

said hub perimeter surface on said first member formed with a series of slots intermediate said rollers;

a series of radially extending blade spring each having an inner end fixedly anchored in one of said hub slots;

a series of circumferentially spaced pairs of spring engaging elements receiving therebetween a free end of a blade spring, said blade springs engaged thereby in a circumferential direction but not restrained in a radial direction, to create a spring resistance to relative rotation between said first and second flywheel members;

sensor means sensing the extent of relative angular displacement between said first and second members and generating electronic signals corresponding thereto.

19. The torque sensing arrangement according to claim 18 wherein said spring blades are stacked together in groups.

20. The torque sensing arrangement according to claim 18 wherein said spaced pairs of spring engaging elements comprise rollers mounted to said second member spaced radially outward from said support rollers.

21. The torque sensing arrangement according to claim 18 wherein a series of protrusions is formed on said drive member hub surface, each aligned with a respective roller and a groove is formed in each protrusion, a respective one of said rollers rolling in each groove.

22. The torque sensing arrangement according to claim 21 wherein said support rollers are toroidal in shape having an outer, semicircular-in-section shape, said grooves in said protrusions of a semicircular mating shape, whereby both radial and endwise support for said second member is provided.

23. The torque sensing arrangement according to claim 18 wherein said driven second member has a starter gear mounted thereon adapted to be driven by a starter motor, whereby start up shock on said starter motor is avoided.

24. The torque sensing arrangement according to claim 18 further including a needle bearing mounting each support roller.

25. The torque sensing arrangement according to claim 21 wherein each support roller comprises a ball bearing having an outer race element received in a groove of a respective protrusion.

* * * * *

UNITED STATES PATENT AND TRADEMARK OFFICE
CERTIFICATE OF CORRECTION

PATENT NO. : 5,485,757
DATED : January 23, 1996
INVENTOR(S) : W. John Foxwell

It is certified that error appears in the above-indentified patent and that said Letters Patent is hereby corrected as shown below:

Abstract, line 10, "member is" should be --members are--.

Abstract, line 11, "132" should be --133--.

Column 2, line 41, "convertor" should be --converter--.

Column 2, line 50, "arrangement" should be --arrangements--.

Column 3, line 38, "made" should be --made and--.

Column 3, line 59, "such" should be --such functions--.

Column 4, line 23, delete "transmission".

Column 5, line 24, "holes" should be --holes 17A--.

Column 5, line 60, "24 and 25" should be --24 and 24A--.

Column 6, line 10, "electroptical" should be --electro-optical-

Column 7, line 48, "is" should be --is a--.

Column 7, line 64, "are" should be --are a--.

Column 8, line 27, "are" should be --are a--.

UNITED STATES PATENT AND TRADEMARK OFFICE
CERTIFICATE OF CORRECTION

PATENT NO. : 5,485,757

DATED : January 23, 1996

INVENTOR(S) : W. John Foxwell

It is certified that error appears in the above-indentified patent and that said Letters Patent is hereby corrected as shown below:

Column 8, line 35, "spring" should be --springs--.

Column 10, line 66 (Claim 18), "spring" should be --springs--.

Signed and Sealed this

Twentieth Day of August, 1996

*Attest:*

BRUCE LEHMAN

*Attesting Officer*   *Commissioner of Patents and Trademarks*